Nov. 20, 1945.   W. F. ROSS   2,389,549
MACHINE FOR HONING TOOTH GROOVES OF GEAR FINISHING TOOLS
Filed Feb. 4, 1941   4 Sheets-Sheet 1

Inventor
Walter F. Ross

Nov. 20, 1945.   W. F. ROSS   2,389,549
MACHINE FOR HONING TOOTH GROOVES OF GEAR FINISHING TOOLS
Filed Feb. 4, 1941   4 Sheets-Sheet 3

Inventor
Walter F. Ross

Patented Nov. 20, 1945

2,389,549

UNITED STATES PATENT OFFICE 2,389,549

MACHINE FOR HONING TOOTH GROOVES OF GEAR FINISHING TOOLS

Walter F. Ross, Springfield, Vt., assignor to The Fellows Gear Shaper Company, Springfield, Vt., a corporation of Vermont Application February 4, 1941, Serial No. 377,279

25 Claims. (Cl. 51—58)

The purpose of the present invention is to provide a machine by which the sides of the grooves in the tooth faces of gear finishing tools, commonly known as "shaving" tools, may be brought to a smooth finish with removal of surface irregularities and exposure of clean hard metal.

Tools of the character here referred to as shaving tools are employed to finish gears by cutting away irregularities on the side faces or flanks of their teeth with a scraping action and exact control of the depth of cutting. These tools are made in the form of master gears conjugate to the gears which they are designed to finish and are fashioned from hard metal compositions, such as high speed steel, carbon tool steel, or other alloy steel suitable for making metal cutting tools. At least the tooth bearing part of the tool is made of such composition. In the manufacture of such tools, grooves are cut in the side faces of the teeth extending from the crests toward the roots of the teeth. These grooves are spaced apart from one another and the lands left between them are segments of the original faces of the teeth. The boundaries of the lands, where they meet the sides of the grooves, provide the edges which are relied on for scraping or shaving the gears to be finished. After the teeth have been cut to approximate form and dimensions and the slots have been cut in their faces as described, the tools are hardened by appropriate heat treatment and the sides of their teeth, i. e., the lands intermediate the grooves, are ground to the exact prescribed curvature and with the prescribed spacing from tooth to tooth.

Prior to the advent of the present invention and that disclosed in my Patent No. 2,338,061, December 28, 1943, the sides of the grooves have received no attention after the heat treatment. The tools with ground tooth face lands have been put out as finished products with the sides of the intersecting grooves in the same condition as when they were hardened and sand blasted. Many tools so made have been unsatisfactory in respect to their ability to finish gears accurately and with the desired smoothness of surface. I have made extensive studies seeking to discover the causes of such deficiencies and have found that one cause is the roughness of the bounding surfaces of the grooves and the fact that these surfaces have a soft skin or decarbonized surface of greater or less extent. These defects prevent the cutting edges from having the continuity and sharpness necessary for producing the best results, which they would have if the surfaces referred to were finished to the clean hard metal.

Another factor which interferes with satisfactory performance of such tools is the burr or wire edge which occurs on all the cutting lands each time the tools are sharpened by grinding away the faces of the teeth.

It is the purpose of this invention to provide a means by which the sides of the grooves may be finished accurately after hardening, by removing roughnesses and the friable surface or skin, in the course of initial production of the tool, and by which the burr produced by grinding the side faces of the tooth may be removed after sharpening.

The invention herein described is one embodiment of means which I have devised for this purpose and consists in assemblages of hones adapted to enter the lateral tooth grooves of such a tool, combined with means for bringing such hones to bear alternately on opposite sides of the grooves in which they are entered and to move them back and forth in rubbing contact with the surfaces on which they thus bear. Another invention which I have devised for a like purpose is disclosed in a companion application for patent.

The principles of the invention are hereinafter set forth and claimed in connection with the description of one specific embodiment thereof which is illustrated in the drawings, but without intent to limit my protection to the details of such embodiment except as expressly appears from the claims.

In the drawings—

Like reference characters designate the same parts wherever they occur in all the figures.

Figures 1, 2, 3, 4:
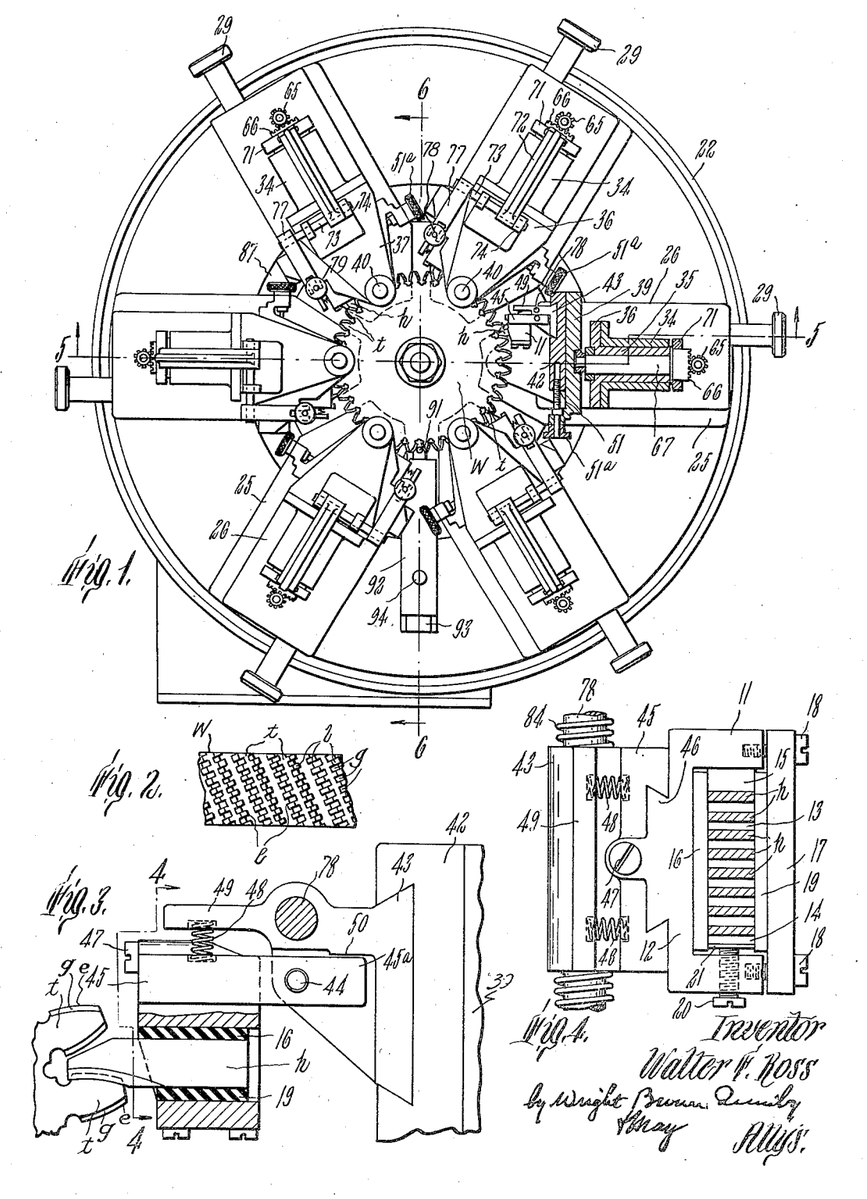
Fig. 1 is a plan view of a machine containing the embodiment referred to, with one of the hone assemblages shown partly in section.
Fig. 2 is a fragmentary side elevation of a shaving tool of the type upon which the machine is designed to operate.
Fig. 3 is a detail plan view, partly in section, of one of the honing tool units and the supporting means therefor.
Fig. 4 is a sectional elevation of the same assemblage as seen from line 4—4 of Fig. 3 looking in the direction of the arrows applied to said line.

A gear finishing or shaving tool of the character on which this machine is designed to operate is represented at W in the center of Fig. 1, and a fragment of such tool is shown in side elevation in Fig. 2. Such tool has teeth $t$ which are essentially like gear teeth in their arrangement and form, and may be either parallel to the axis or helical; corresponding to spur and helical gears respectively. It differs from conventional gears chiefly in being made of material suitable for metal cutting tools and in having grooves $g$ in the sides of its teeth. Lands $l$ are left between the grooves, and the edges $e$, where the lands meet the sides of the grooves, are the cutting edges of the tool.

For removing the superficial substance on the sides of the grooves $g$, I have provided a tool unit such as is shown in Figs. 3 and 4. This comprises a number of thin hones $h$ of which the thickness is enough less than the width of the grooves $g$ to permit their entrance into such grooves readily, the width at the outer ends is less than the space between adjacent teeth $t$, and one boundry adjacent to the end is curved to an approximation of the curve of the tooth substance at the bottoms of the grooves $g$. The margins of the side faces adjoining that boundary are the parts which act on the sides of the grooves into which the hone enters, and sharpen the cutting edges. Such hones may be slabs of natural stone or artificial agglomerations of hard granular material.

A number of such hones are assembled in a holder 11. The holder is a recessed block having separated side walls or jaws and a rear wall 12. The hones are piled, with intermediate separators 13, in a stack which, with a supporting block 14 and filler block 15, is placed between the jaws of the holder against a backing slab 16, and is secured in the holder by an outer clamp plate 17 which is fastened to the holder by screws 18, and between which and the stack of hones is a slab 19. The separators 13, filler blocks 14 and 15 and slabs 16 and 19 are of rubber or other suitable yielding material, preferably a synthetic product analogous to rubber which is unaffected by oil. They confine each of the hones on four sides with a yielding grip, which holds them firmly but yields sufficiently to enable all the hones to bear with approximately equal force against the sides of the grooves into which they are entered, and also to guard against breakage of the somewhat brittle hones. The separators 13 have suitable thicknesses and are suitably arranged to space the hones conformably with the grooves of the shaving tool teeth, so that all will enter at the same time into different grooves when the honing unit is brought into operative engagement with the shaving tool. A screw 20 threaded through the lower jaw of the holder bears on a rigid plate 21 beneath the yieldable block 14 and serves to consolidate the stack of hones and separators. As shown in Fig. 3, the hones are mounted in the holder so that the operating end protrudes, in equal measure as to all of the hones, sufficiently to enter between the teeth of the shaving tool and into the grooves in the side of one of such teeth. Preferably the number of hones is equal to the number of grooves in any tooth of the shaving tool, whereby the corresponding faces of all such grooves may be acted on at the same time.

The tool unit thus described is mounted and operated in a manner later described.

This machine is provided with a number of duplicate honing units adapted to operate simultaneously on a like number of teeth of a sufficiently large shaving tool. They are adjustable to accommodate shaving tools of different diameters and different tooth spacings; and any one or more may be put out of action when operating on a shaving tool too small to permit simultaneous action of them all.

Figures 7, 8, 9:
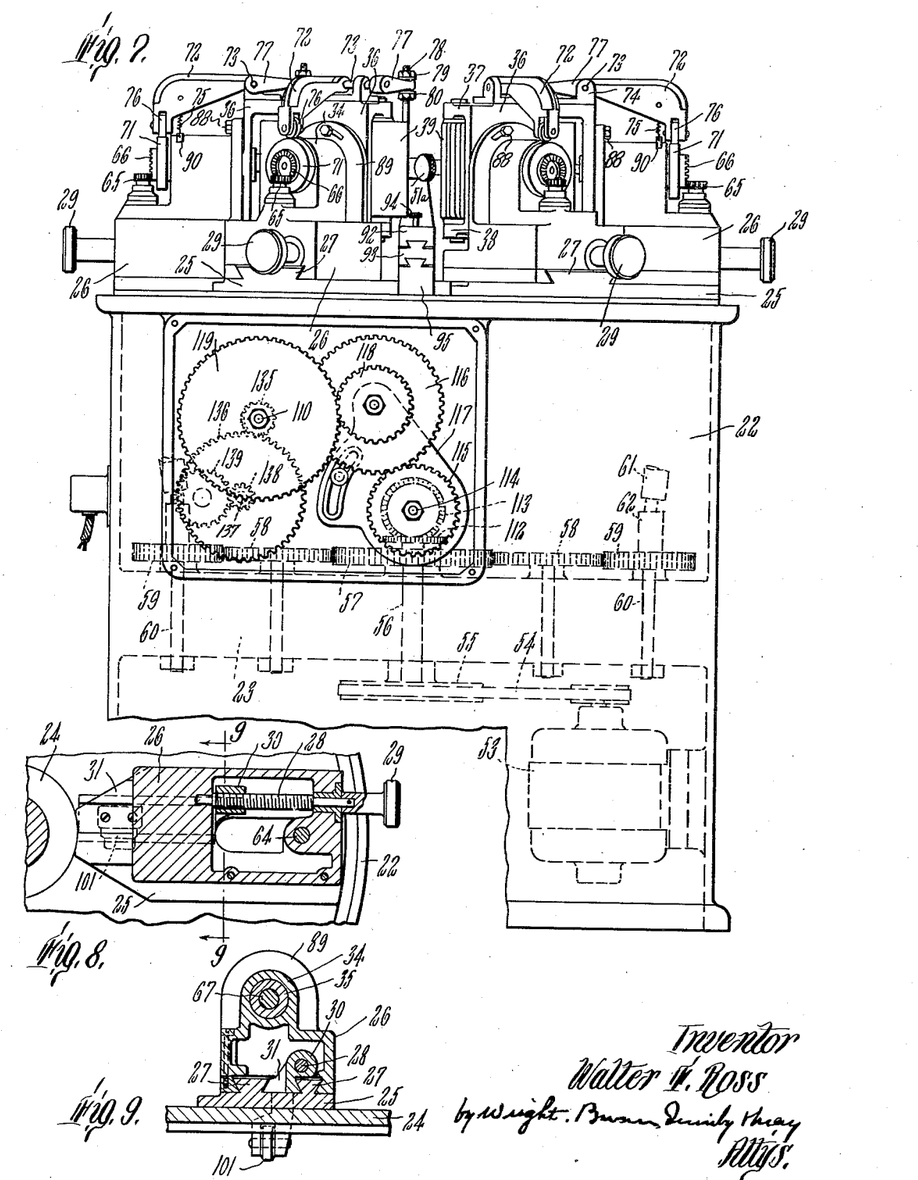
Fig. 7 is a an elevation of the machine as seen from the left hand side of Fig. 1.
Fig. 8 is a fragmentary horizontal section taken on line 8—8 of Fig. 5.
Fig. 9 is a vertical section taken on line 9—9 of Fig. 8.

The base frame or pedestal 22 of the machine is a hollow cylindrical structure in which there is an intermediate transverse partition 23 for mounting shafts of power transmission mechanisms, and on the upper end of which is a table 24 on which the several hone-supporting heads are mounted. Each of such heads comprises a base plate 25 resting on the table 24 and a carriage 26 supported on the plate 25 and adjustable toward and away from the axis of the pedestal 22. The carriage 26 is engaged with radial guideways 27 on the base, as shown in Fig. 9, and is adjusted by means of a screw 28 having a protruding knob 29 for manipulation. The screw is mounted rotatably, and withheld from axial movement, in bearings in the carriage and is meshed with threads in an ear 30 on an auxiliary slide 31 which, also, is supported slidingly in a radial guideway of the base plate 25. A spring 32 (Fig. 5) reacting between a downward projection on the slide 31 and the base 25, forces the auxiliary slide against an abutment constituted by the cam 33 (later described) with sufficient force to hold slide 31 as a stationary abutment for the screw when adjustments of the carriage are made.

Carriage 26 has a bearing 34, radial to the before mentioned axis, in which there is mounted a tubular shaft or sleeve 35 carrying a bracket 36 having upper and lower spaced arms 37 and 38 projecting toward the axis of the machine. A swing frame 39 is supported on and between the last named arms by alined pivots 40 and 41 and is offset at its central part outwardly from the pivots and from the axis of the pedestal 22. In its inner side it has a guideway extending transversely of the axis of the pivots in which a slide 42, hereinafter referred to as a cross slide, is confined. In the inner side of slide 42 there is a guideway extending parallel to the axis of pivots 40 and 41 in which is confined a reciprocating slide 43, (see Figs. 1 and 3). The reciprocating slide carries, by means of a pivot 44, a two armed lever 45, one arm of which has an undercut guideway receiving a dovetail rib 46 on the hone unit holder 11, and in which the rib is secured by a screw 47. The hones are thus held in a location where their curved edges cross a plane radial to the axis of pivots 40, 41 and parallel to the path of slide 42. Springs 48 react between the lever 45 and a projection 49 of the slide 43 and normally hold the second arm, 45a, of lever 45 against a shoulder 50. A screw 51 held in a bearing on the swing frame 39 and having an external knob 51a for manipulation, enters a threaded passage in the cross slide 42 and serves to adjust such slide laterally. This screw, and the screw 28, constitute means for adjusting the hone holder with components of tangential and radial motion relatively to the work holder. The tangential adjustments place the curved edges of the hones more or less near to the pivot axis, in positions where such edges are in more or less closely approximate coincidence with circular arcs centered on said axis.

Figure 5:
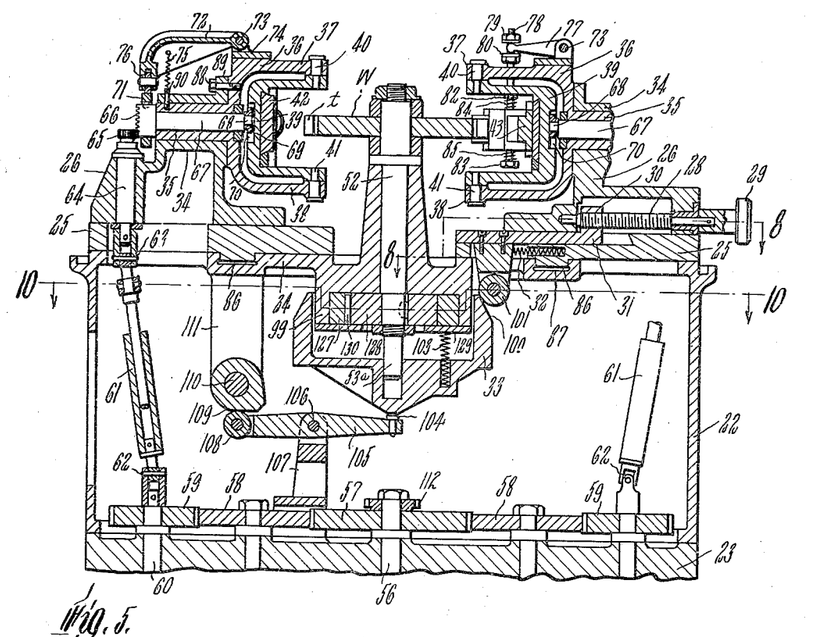
Figs. 5 and 6 are vertical axial sections of the machine taken on lines 5—5 and 6—6 respectively of Fig. 1.

In the center of the table 24 of the main frame, which is there provided with a bearing of suitable length, is mounted an upright work holder or spindle 52 on which the shaving cutter W to be honed is mounted and secured, as shown by Fig. 5. The adjustments afforded by the screws 28 and 51 together with an adjustment of the entire hone-supporting head, later described, enable the honing tool unit to be located with respect to any such shaving tool where it may oscillate about an axis near the approximate center of curvature of a tooth of the tool and may engage the tooth so related to such axis of oscillation. The shaving tools to which the herein illustrated embodiment of this invention particularly relates are designed to finish involute gears and are themselves of involute tooth curvature. While an involute curve has no single center of curvature, it is possible, however, to locate a center about which the arc of a circle conforms closely enough to that part of the involute which constitutes a tooth face for performance of the honing action along the entire length of the cutting edges of the shaving tool. The mounting here described for the honing tool unit enables the tool unit to be oscillated about such a center. When the hones are entered into the grooves g of a shaving tool tooth, and brought against the bottoms of one or more of the grooves, the adjustment is such that the lever arm 45a is withdrawn from stop 50 and the curved edges of the hones are in near conformity with the curvature of the bottoms of the groove in which they are entered. The springs 48 permit the hones to yield enough to compensate for disparity between the path of oscillation of the hones and the curvature of the shaving tool teeth.

Oscillation is imparted to the hone unit and swing frame 39 by a train of mechanism driven by a motor 53 in the base 22 (Fig. 7). This motor, by means of belt 54 and pulley 55, drives a shaft 56 coaxial with the work spindle 52. A gear 57 secured to shaft 56 drives, through an idle gear 58, a gear 59 on shaft 60. The latter shaft is connected by means of a telescopic shaft 61 and universal joints 62 and 63 with a shaft 64 rotating in a bearing in the carriage 26. A pinion 65 on shaft 64 drives a face gear 66 on a shaft 67 which rotates coaxially in the sleeve 35 on which the bracket 36 is mounted. The inner end of shaft 67 carries an eccentric crank pin 68 on which a roller 69 is mounted, which roller occupies a slot or groove 70 in the outer face of the swing frame 39. The length of slot 70 in the direction parallel to the axis of pivots 40 and 41 is longer than the sum of the diameter of the roller and the diameter of the crank orbit, or is at least as long; while in the direction transverse to such pivot axis, it is equal to the diameter of the roller, whereby the rotation of the crank pin is enabled to swing the frame back and forth and thereby vibrate the hones lengthwise of the grooves g.

The hones are caused to bear alternately on opposite bounding faces of these grooves by means of a cam 71 carried by shaft 67 and acting on an arm 72 which is secured to a rock shaft 73 rotatable in a bearing bracket 74 mounted on the upper arm of bracket 36. A spring 75 holds a roller 76, which is carried by arm 72, constantly against the periphery of the cam. A second arm 77, is secured to shaft 73 and has a forked end embracing a rod 78 and confined between two nuts 79 and 80 which are adjustably mounted on the rod. Rod 78 passes through the hone-carrying slide 43, in which it is free to move endwise, and it carries abutments 82 and 83 above and below said slide respectively, between which and the slide springs 84 and 85 are confined. The oscillating movement of rock shaft 73 is transmitted to the slide 43 and hones through the springs 84 and 85, whereby the hones are caused to bear against the sides of the grooves in which they are received, with yielding force limited by the strength of the springs.

Figure 10:
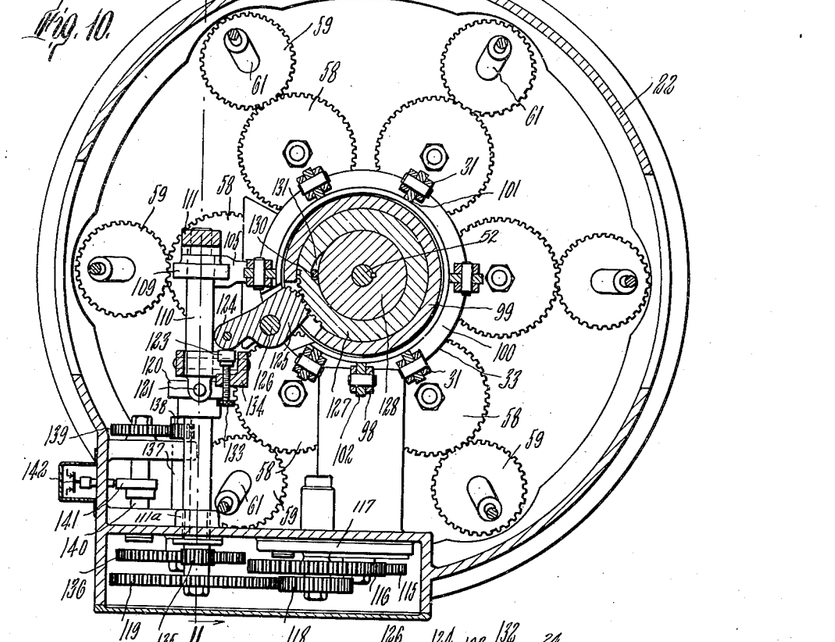
Fig. 10 is a horizontal section taken on line 10—10 of Fig. 5.

All the hone units are thus driven by duplications of the trains of mechanism last described. The central motor-driven gear 57 transmits motion through idle gears arranged in a circle around it, as shown in Fig. 10, to the different hone-supporting heads.

These heads are adjustable around the axis of the work spindle to accommodate the hones to different shaving tools having different numbers and spacings of teeth. So the hone head bases 25 are movable laterally over the top of the table 24 and have tongues or ribs 86 on their under sides occupying a circular groove 87, coaxial with the work spindle, in the upper side of the table. The tongues and groove maintain the hone heads at a uniform distance from the work spindle and in radial relationship thereto, in all adjustments. The weight of these heads is sufficient to hold them in their various positions of adjustment, since no forces act with tendency to displace them. But, if desired, clamping means of known character may be provided in addition to secure them. The universally jointed telescopic shaft sections 61 permit the heads to be thus adjusted laterally and the carriages 26 to be adjusted radially on the bases 25, and transmit power in all positions of the carriages. Suitable openings are provided in the table 24 and the hone head bases 25 to contain the connections between the telescopic shaft sections and the shafts 64.

The bracket 36 is also adjustable angularly about the axis of its supporting sleeve or tubular shaft 35, to accommodate the helix angle of the teeth of the shaving tool W. It is secured in its adjusted positions by a clamp screw 88 threaded into the bracket and passing through an arcuate slot in a flange 89 on the carriage 26 contiguous to bracket 36. The mechanism, including arm 72, which causes the hones to bear alternately on opposite sides of the grooves in the shaving tool teeth, is adjustable with the bracket 36, being supported thereon, and the spring 75 which forces arm 72 toward its impelling cam 71 is anchored by a pin 90 set into the sleeve 35 and protruding through a slot in the bearing by which this sleeve is held on the carriage 26.

Figure 6:
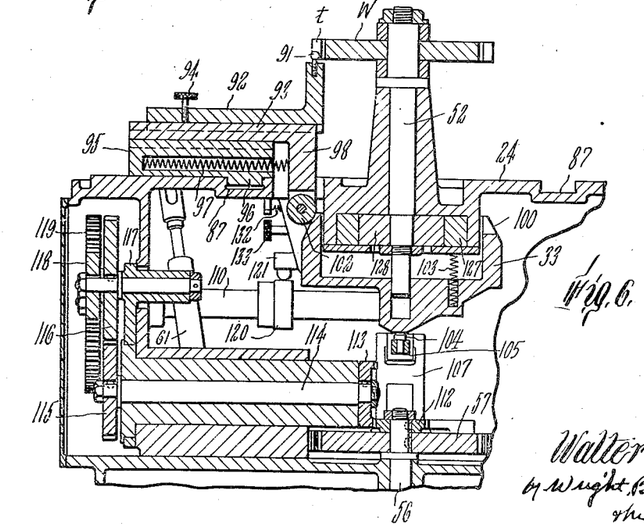

The shaving tool is held stationary during the operation of the hones by a locking plunger 91 (Fig. 6) supported by a slide 92 which is adjustable toward and away from the work spindle on a plunger carriage 93 and is secured in its adjustments by a set screw 94. Plunger carriage 93 is mounted slidingly on a plunger carriage base 95 which rests on the table 24 and is adjustable angularly about the work spindle in the same manner as the hone head bases, having a tongue 96 on its under side contained in the circular groove 87. Dovetail guides and guideways, similar to those shown in Fig. 9, provide for the sliding engagement of carriage 93 with base 95 and of the slide 92 with the carriage. They are indicated by dotted lines in Fig. 6, and are shown in end view in Fig. 7. A spring 97 reacting between the base 95 and downward projection 98 on carriage 93 causes the locking plunger to enter the contiguous tooth space of the shaving tool and to bear firmly on the teeth flanking such space.

The shaving tool is thus held stationary for a length of time which has been determined as sufficient for a honing operation, and is then automatically indexed to bring other teeth into position beside the respective hone units. But before indexing, the hones and locking plunger are retracted clear of the shaving tool. Such retraction is effected by the abutment cam 33 previously referred to, and by cam operating mechanism which will now be described.

The cam 33 is a cylindrical shell having a bearing on a downward extension 53a of the work spindle and shaped so as to embrace a cylindrical rib 99 depending from the under side of the table, which surrounds a part of the indexing mechanism later described. The cam has a conical zone 100 against which rollers 101 carried by depending brackets secured to the auxiliary slides 31 of the respective hone heads are caused to bear by the springs 32, and a roller 102 carried by the locking plunger carriage 93 is caused to bear by spring 97. When the cam is in its lowered position, shown in the drawings, to which it is brought by gravity and the supplementary action of springs 103, it allows the locking plunger and hones to come into their operative positions. When raised, it retracts the locking plunger and hones beyond the outside circumference of the shaving tool; the conical face 100 being suitably arranged and having a sufficient width and extent of movement for that purpose. The cam is supported at the central point of its under side by a stud 104 carried by one arm of a lever 105 pivoted at 106 on a bracket 107 supported by the transverse partition 23. The other arm of lever 105 carries a roller 108 in engagement with a cam 109 secured to a shaft 110 which is supported rotatably at one end in a bearing in a depending hanger 111 rigidly connected with table 24 and at its other end in a bearing 111a in the side of the base. Shaft 110 is rotated by the following mechanism.

A gear 112 (Fig. 6) secured to shaft 56 meshes with a face gear 113 secured to a radial shaft 114, on the outer end of which is one member, 115, of a changeable gear train. The rest of the train consists of gear 116 meshing with 115 and supported by a quadrant 117, adjustable angularly about the axis of shaft 114, (see also Fig. 7); a gear 118 in rigid connection with gear 116, and a gear 119 meshing with 118 and secured to shaft 110. By selection of appropriate change gears, the withdrawing cam 33 may be operated at intervals long enough to give whatever time is necessary for the honing action.

Figure 11:
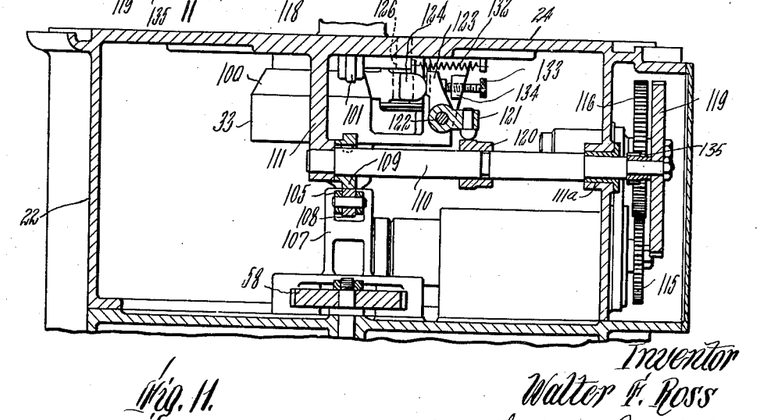
Fig. 11 is a vertical section taken on line 11—11 of Fig. 10.

A second cam, 120, on shaft 110 causes the work spindle to be indexed. It is set with respect to cam 109 so as to operate the indexing mechanism when the hones and locking plungers are in their withdrawn position. It acts on the arm 121 (Figs. 10 and 11) of a bell crank lever which is supported by a pivot 122 on a part of the framing structure. The other arm, 123, of said bell crank lever bears on an arm 124 projecting from a gear segment 125 which is mounted on a stationary pivot 126, parallel to the work spindle 52, and the teeth of which engage peripheral teeth on a ring 127. The latter ring is rotatable within the annular flange 99, in which it has a bearing coaxial with the work spindle, and surrounds a collar 128 which is secured to the work spindle.

A plate 129 fastened to the spindle supports ring 127. The ring is coupled to the collar 128, when rotated in one direction, by a roller clutch consisting of a roller 130 contained in an eccentric groove 131 in the inner circumference of the ring and bearing on the outer side of the collar 128. The force application of the cam 120 causes segment 125 to be turned in the direction which binds the roller clutch and rotates the work spindle. A spring 132, connected to the arm 124 and the stationary structure, retracts the segment and ring. The extent of angular indexing movement is limited by an adjustable stop screw 123 mounted in a stationary part 134 in position to engage the lever arm 123 and limit its return movement under the force application of spring 132 transmitted through arm 124. That is, the stop screw provides a greater or less extent of lost motion between the cam 120 and lever arm 121.

A pinion 135 on cam shaft 110 meshes with a gear 136 on a shaft 137; and a pinion 138 on the latter shaft meshes with a gear 139 on a cam shaft 140. A cam 141 on shaft 140 controls an electric switch 142 in the circuit of the driving motor 53, and is organized to open the circuit of said motor when the work spindle has been indexed enough times to accomplish honing of the face grooves in all the teeth of the shaving tool being operated upon. The gears 135, 136, 138 and 139 are interchangeable with others, whereby to vary and regulate the elapsed time between starting and stopping of the motor. The two changeable gear trains (115, 119, 135–139, respectively), enable any desired number of honing strokes to be applied to each tooth of the work piece, and the number of series or cycles of such honing strokes to be adjusted to the number of teeth possessed by any particular work piece.

The manner of operation of the machine, and the sequence of steps thereof, will be apparent from the foregoing description without further explanation. It may be noted, however, that all of the hone units are arranged to bear on the same side of the teeth with which they are respectively engaged. Thus after all of the teeth have been honed on one side, the shaving tool must be reversed on the work spindle and the cycle repeated on the other side of its teeth. But it is possible, and within the contemplation of this invention, to reverse the positions of some of the hone holders on their respective supporting heads, so that some of the hone units will bear on the right hand side of certain teeth of the work piece, while other hone units bear on the left hand side of other teeth. With such an arrangement all the teeth may be honed on both sides without reversal.

Although I have here described a specific honing apparatus designed to perform a specific character of work, it is to be understood that the invention includes all modifications and equivalent variations of this specific disclosure which are capable of performing analogous operations of specifically different character. In other words, the invention is not limited to the specific use herein disclosed, but includes all other uses to which its novel principles may be applied. And various mechanical equivalents for the specific constructions herein disclosed are likewise included within the scope of the invention. However, and without limiting the generality of the foregoing statements, I claim exclusive ownership to the specific hones, honing assemblages, and operating means therefor, designed and adapted to perform the specific operations hereinbefore set forth.

What I claim and desire to secure by Letters Patent is:

1. A machine for honing the sides of grooves in the faces of the teeth of a gear shaving tool comprising a work support adapted to hold such a tool, a supporting bracket mounted at one side of the work support, a swinging member pivoted to said bracket to swing about an axis at one side of the work support, a hone holder supported on said swinging member with provisions for movement thereon in a path extending in substantially the same direction as the pivotal axis of the swinging member, a hone and resilient separators confined between embracing portions of said holder with the separators disposed between the faces of the hone and such embracing portions and the hone projecting from the holder and separators toward the work support, the projecting portion of the hone being of outline and dimensions enabling it to enter such a groove of a shaving tool mounted on the work support, means for oscillating the swinging member about its pivotal axis, and means for shifting the hone holder back and forth in its prescribed path on the swinging member in a predetermined timed relation with the swinging movements of the swinging member.

2. A machine for honing the bounding walls of grooves formed in the tooth spaces of a gear-like shaving tool comprising a base, a work support mounted on said base and adapted to hold such a tool, a supporting bracket mounted on said base at one side of the work support with provisions for adjustment toward and away from the work holder and also transversely thereof, a swinging member pivoted to said bracket for angular movement about an axis at one side of the work support, a hone holder mounted on said swinging member in guided engagement therewith for movement in a path substantially parallel to the pivotal axis thereof, a hone secured to said holder and projecting therefrom toward the axis, having outlines and dimensions enabling it to enter one of the grooves of such a tool, mechanism in coupled relation with the swinging member constructed and arranged to impart back and forth movements thereto about said axis, and other mechanism for imparting back and forth movements to the hone holder in its prescribed path on the swinging member, said last-named mechanism including resilient coupling means arranged to transmit force in a yielding manner to the hone holder.

3. A machine for honing the sides of grooves in the faces of the teeth of a gear shaving tool comprising a work support adapted to hold such a tool, a honing unit having hones formed and arranged to enter grooves in a side of such a tooth, a supporting bracket, a swinging member pivoted to said bracket on which the honing unit is mounted with provision for reciprocating movement substantially parallel to the axis of the swinging member, means for oscillating the swinging member, and means for applying force yieldingly and in alternately opposite directions to the honing unit for so reciprocating said unit.

4. A machine for performing an abrading action on lateral portions of teeth analogous to gear teeth comprising an abrading instrument, carrying means for said instrument having provisions for back and forth movement in a curved path and for reciprocating movement in a secondary path substantially parallel to the axis of said curved path, a support adapted to hold a toothed work piece with the lateral portion to be abraded of a tooth thereof in approximate coincidence with said curved path, means for reciprocating the abrading instrument in said curved path, and means for applying force yieldingly to the abrading instrument alternately in opposite directions tending to move it in its secondary path.

5. A machine for honing the sides of grooves in the faces of the teeth of a gear-like tool comprising a hone holder, a collection of hones and resilient separators between the hones mounted in said holder in an arrangement such that the hones may enter a number of such grooves simultaneously, supporting means for said hone holder providing for movement of said holder in a curved path and also in a secondary path extending in the general direction of the axis of said curved path, a work holder, said supporting means and work holder being relatively adjustable so that the hones are enabled to enter the grooves of such a work piece and move lengthwise therein when the hone holder travels in its said curved path, means for reciprocating said hone holder in said curved path, and means for moving the hone holder back and forth in said secondary path with yielding pressure to cause bearing of the hones simultaneously on corresponding sides of the grooves in which they are respectively entered, first on one side and then on the opposite side of said grooves.

6. A machine as set forth in claim 5 combined with provisions for adjusting the hone holder support angularly about an axis transverse to the center of said curved path.

7. In a machine of the character described, a supporting structure, a work spindle mounted thereon, a tool head on said supporting structure adjustable angularly around said spindle and radially toward and away therefrom, a bracket mounted on said tool head, a swing frame pivoted to said bracket, the bracket being adjustable on the tool head to place the pivot axis of said swing frame parallel or at an inclination with respect to the work spindle, and an abrading tool carried by said swing frame at a distance from said pivot axis.

8. In a machine of the character set forth, a supporting structure, a tool head base mounted on said structure with provision for angular adjustment about a given axis, a carriage on said tool head base adjustable thereon toward and away from said axis, a bracket pivotally connected with said carriage to turn about an axis substantially perpendicular to the first named axis, a swing frame pivoted to said bracket on an axis transverse to the second named axis and adapted to be placed, by adjustment of said bracket, parallel with, and at different slants with respect to, the first named axis, actuating mechanism operatively engaged with said swing frame for oscillating it about the third mentioned axis, and an abrading tool mounted on the swing frame.

9. A machine as set forth in claim 8 combined with provisions for adjusting the abrading tool on the swing frame in a path transverse to the second axis and substantially parallel to the third axis.

10. A machine as set forth in claim 8 combined with an adjusting slide mounted on the swing frame and movable in a path transverse to the second axis and substantially parallel to the third axis, a secondary slide mounted on the before named slide to reciprocate in a path substantially parallel to the third axis, and mechanism for so reciprocating the last named slide.

11. A machine for honing the sides of grooves in the faces of the teeth of a gear shaving tool, comprising a work support adapted to hold such a tool, a honing unit holder having enclosing walls, hones mounted in said holder protruding from one end thereof, separators of resilient material mounted in the holder between the several hones and terminating short of the projecting ends thereof, said hones being relatively disposed to enter at their projecting ends simultaneously into a plurality of grooves in the side of a single tooth of such a tool, a supporting bracket at one side of the work support, a swinging member pivoted to said bracket and to which said holder is connected in position to put the several hones in the grooves of the tooth and to oscillate in a path approximating the face curve of such tooth, and means to oscillate said swinging member.

12. A machine for honing the bounding surfaces of grooves in the sides of the teeth of a gear-like tool, comprising a hone unit consisting of a group of hones and intermediate resilient separators in superposed relation and a holder in which said hones and separators are mounted and from which the hones project sufficiently to enter the grooves of such gear-like tool, each into one of said grooves, means for supporting and reciprocating said hone unit in a course to cause movement of the hones back and forth along the grooves in which they are contained, and means for shifting said unit transversely to its path so as to cause bearing of the hones first on one side, and then on the other side, of the grooves in which they are respectively contained; the separators being sufficiently yielding to permit substantially uniform bearing of the several hones on the sides of the grooves in which they are respectively contained.

13. A machine for honing the bounding walls of grooves formed in the tooth faces of a gear-like tool, comprising a holder, hones and intermediate separators of yieldable resilient material secured in superposed relation in said holder, the hones protruding from said holder with spaces between them of sufficient width, and being of suitable thickness, to permit simultaneous entrance of the several hones into different grooves of the tool, cooperative supporting means for mounting such a gear-like tool and the hone holder in relative positions to locate the hones in said grooves, and means for reciprocating the hone holder in directions corresponding substantially with the length of the grooves; the yieldable separators enabling the several hones to come into simultaneous bearing on corresponding walls of the respective grooves in which they are contained.

14. A machine for honing the bounding walls of grooves in the tooth faces of a gear shaving tool, comprising a supporting bracket, a swinging member pivoted to said bracket, a hone unit including a holder mounted on said swinging member, hones of a thickness less than the width of such grooves and intermediate yieldable separators of a thickness greater than the distance between contiguous sides of adjacent grooves mounted in superposed relation on said swinging member with the hones protruding from the holder in relative positions such as to permit their simultaneous entrance into different grooves of a suitably mounted shaving tool, means for so mounting a shaving tool that grooves in the side of a tooth thereof receive such hones and extend in the approximate direction in which the received portions of the hones are movable with the swinging member, and means for oscillating said swinging member about its pivot axis.

15. A honing machine as set forth in claim 14, combined with means for shifting the honing unit back and forth transversely to its path of oscillation to bring the hones alternately into contact with opposite sides of the receiving grooves.

16. A machine for performing an abrading action on the bounding sides of a plurality of grooves in a work piece simultaneously, which comprises a work support adapted to hold such a work piece, an abrading tool holder mounted for movement in a prescribed path operatively related to said work support, a plurality of abrading elements and intermediate resilient separators secured to said holder with the abrading elements protruding from the holder in spaced apart relation adapted for entrance at the same time each into one of such grooves, the spaces between adjacent elements being continuous, of constant width, and wide enough to receive the solid material of the work piece existing between adjacent grooves, and means for moving said holder in its prescribed path.

17. A machine for performing an abrading action on the sides of a plurality of grooves in a work piece simultaneously, which comprises a work support adapted to hold such a work piece, an abrading tool holder mounted for movement in a prescribed path operatively related to said work support, a plurality of abrading elements and intermediate resilient separators secured to said holder with the abrading elements protruding from the holder in spaced apart relation adapted for entrance at the same time each into one of such grooves, means for moving said holder back and forth in its prescribed path, and means for moving the holder back and forth in directions transverse to said path in a manner to cause alternate engagement with the abrading elements with opposite sides of the grooves into which they project.

18. A machine for performing an abrading action on gear like articles, comprising a supporting structure having a work support on which an article with teeth of gear tooth character may be mounted, an abrading tool holder mounted on said supporting structure to swing about an axis at one side of the location occupied by a tooth of such an article when in operative position on said work support, an abrading tool carried by said holder having a boundary lying in approximate coincidence with a circular arc centered on such axis and active side faces adjoining said boundary, means for adjusting the abrading tool holder and tool radially and tangentially of the work support, and means for oscillating said tool holder about said axis.

19. A machine for performing an abrading action on gear like articles, comprising a supporting structure having a work support on which an article with teeth of gear tooth character may be mounted, an abrading tool holder mounted on said supporting structure to swing about an axis at one side of the location occupied by a tooth of such an article when in operative position on said work support, an abrading tool carried by said holder having a boundary lying in approximate coincidence with a circular arc centered on such axis and active side faces adjoining said boundary, means for effecting relative adjustment between the tool holder and work support with components of movement radial and tangential with respect to the work support, and means for oscillating said tool holder about said axis.

20. A machine for honing the sides of grooves in the faces of the teeth of a gear shaving tool comprising a work support adapted to hold such a tool, a honing unit having hones with substantially parallel active side faces and an intermediate face intersecting said side faces in curved lines, a supporting bracket, a swinging member pivoted to said bracket on which the honing unit is mounted in position to oscillate about an axis nearly coincident with the approximate center of curvature of said curved lines, and means to oscillate said swinging member.

21. A machine for honing the bounding side walls of grooves in the sides of the teeth of a gear-like tool, comprising a work support adapted to hold such a tool, a hone unit having a number of hones arranged side by side with spaces between them whereby they are adapted to enter simultaneously a like number of such grooves, the opposite side faces of the entering portion of each hone and those of all the hones being in substantially parallel planes, means for reciprocating the hone unit in a path such that the hones move back and forth in the planes of said faces, and means for shifting said unit transversely of said planes so as to cause action of the hones first on one side, and then on the other side, of the grooves in which they are respectively contained.

22. A honing machine as set forth in claim 21, in which the path of reciprocation of the hone unit is curved, combined with provisions for shifting the unit so that its path conforms substantially with the angular disposition of the teeth of different work pieces.

23. A honing machine as set forth in claim 21, in which the path of reciprocation of the hone unit is curved, combined with provisions for adjusting the unit so as to alter the location of such path with respect to the work support and also to vary the rate of curvature of the path.

24. A machine for honing the sides of grooves formed in the side faces of the teeth of a gear-like work piece, comprising a work spindle adapted to support such a work piece, a plurality of hone heads disposed angularly about said spindle, hone elements mounted on said heads, each hone element being of a width less than that of the space between two teeth of the work piece and of a thickness less than the width of the grooves in such teeth and having a bounding edge generally similar in outline to the side faces of the work piece teeth, the lateral faces of the element contiguous to said edge being the active abrading portions thereof, the hone elements on the several heads being disposed to enter different tooth spaces of the work piece and protrude into grooves of respectively adjacent teeth, and means for simultaneously actuating the hone elements to effect an abrading action on the sides of such grooves.

25. A honing machine as set forth in claim 24, combined with automatic means for withdrawing the several hone heads from the work spindle and means for indexing the spindle, when the heads are so withdrawn, to bring other teeth into operating position adjacent to the hone units.

WALTER F. ROSS.